3,132,161
3-OXYGENATED 20-ALKYNYLPREGNA-
DIEN-20-OLS
Walter R. Benn, Deerfield, Ill., assignor to G. D. Searle
& Co., Chicago, Ill., a corporation of Delaware
No Drawing. Filed Oct. 11, 1960, Ser. No. 61,849
3 Claims. (Cl. 260—397.4)

The present invention is concerned with novel 20-alkynylated steroids of the pregnane series and, more particularly, with 3-oxygenated 20-alkynylpregnadiene-20β-ols of the structural formulae

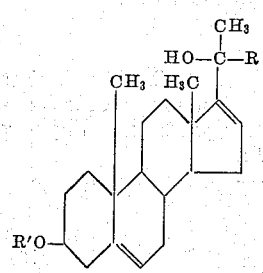

and

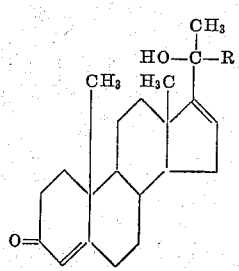

wherein R is a lower alkynyl radical and R' is hydrogen or a lower alkanoyl radical. The lower alkanoyl radicals encompassed by the R' term are, typically, formyl, acetyl, propionyl, butyryl, valeryl, caproyl, and the branched-chain isomers thereof.

Examples of lower alkynyl radicals are ethynyl, propynyl, butynyl, pentynyl, hexynyl, and the branched-chain isomers thereof.

Starting materials suitable for the manufacture of the instant compounds are the lower alkanoic acid esters of 3β-hydroxypregna-5,16-dien-20-one. Treatment of the appropriate ester with an alkynyl Grignard reagent, followed by hydrolysis of the Grignard adduct, suitably with aqueous ammonium chloride, and re-esterification of the 3-hydroxy group results in the instant 3β-(lower alkanoyl)oxy-20-(lower alkynyl)pregna-5,16-dien-20β-ols. This addition reaction can be conducted also in the presence of cuprous salts such as cuprous chloride. This process is specifically illustrated by the treatment of 3β-acetoxypregna-5,16-dien-20-one with the ethynyl Grignard reagent, followed by decomposition of the Grignard addition product, suitably by means of aqueous ammonium chloride, then treatment with acetic anhydride in pyridine to produce 3β-acetoxy-20-ethynylpregna-5,16-dien-20β-ol.

Alternate processes for the preparation of the compounds of this invention involve reaction of the aforementioned 3β-hydroxypregna-5,16-dien-20-one esters with an alkyne in the presence of lithium amide or with the appropriate alkynyl lithium reagent. A method particularly suitable for the preparation of the instant compounds, wherein the alkynyl radical contains greater than 2 carbon atoms, involves conversion of the instant ethynyl compounds to their Grignard derivatives, followed by alkylation with a suitable alkyl ester such as ethyl iodide or dimethyl sulfate.

Hydrolysis of the aforementioned 3β-(lower alkanoyl)oxy-20-(lower alkynyl)pregna-5,16-dien-20β-ols, suitably with aqueous potassium carbonate in methanol, affords the corresponding 3β-ols. Oxidation of these 3β-hydroxy-Δ⁵ compounds under the conditions of the Oppenauer reaction, i.e., treatment with aluminum isopropoxide and cyclohexanone, affords the corresponding 20-(lower alkynyl)-20β-hydroxypregna-4,16-dien-3-ones of this invention. As a specific example, the aforementioned 3β-acetoxy-20-ethynylpregna-5,16-dien-20β-ol is converted to 20-ethynylpregna-5,16-diene-3β,20β-diol by treatment in methanol with aqueous potassium carbonate. The latter diol is allowed to react with aluminum isopropoxide and cyclohexanone, resulting in the instant 20-ethynyl-20β-hydroxypregna-4,16-dien-3-one.

The compounds of this invention display valuable pharmacological properties. They are anti-hormonal agents, for example, as evidenced by their ability to inhibit the sodium-retaining activity of desoxycorticosterone acetate.

The invention will appear more fully from the examples which follow. These examples are set forth by way of illustration only and it will be understood that the invention is not be construed as limited in spirit or in scope by the details contained therein, as many modifications in materials and methods will be apparent from this disclosure to those skilled in the art. In these examples temperatures are given in degrees Centigrade (° C.). Quantities of materials are expressed in parts by weight unless otherwise noted.

*Example 1*

To a saturated solution of acetylene in 1,332 parts of dry tetrahydrofuran is added 100 parts by volume of a 3 N ethereal methyl magnesium bromide solution, and the reaction mixture is heated at reflux for about 2 hours. A solution of 10 parts of 3β-acetoxypregna-5,16-dien-20-one in 90 parts of dry tetrahydrofuran is added, and refluxing is continued for about 3 hours longer. Acetylene gas is bubbled through the reaction mixture during the entire reflux period. The reaction mixture is cooled, then treated with 45 parts by volume of saturated aqueous ammonium chloride, and the supernatant solution is decanted from the resulting precipitated solid material. This aqueous mixture is extracted with ether and the organic layer is washed with saturated aqueous ammonium chloride, dried over anhydrous sodium sulfate, and concentrated to afford an amber-colored gummy residue.

A mixture of this residue, 20 parts of acetic anhydride, and 100 parts of pyridine is heated on the steam bath for about 30 minutes, then poured into water, and the resulting product is extracted with benzene. The organic layer is dried over anhydrous sodium sulfate, then concentrated to dryness in vacuo, and the residue is adsorbed on an alumina chromatographic column.

The chromatographic column is eluted with ethyl acetate-ether mixtures containing increasing proportions of ethyl acetate. The 10% and 20% ethyl acetate in ether eluates are combined and evaporated to dryness to afford a solid residue, which is crystallized from acetone-hexane, resulting in pure 3β-acetoxy-20-ethynylpregna-5,16-dien-20β-ol, M.P. 142.5–144°; [α]$_D$=−80° (chloroform). It displays infrared maxima at about 2.75, 3.01, 5.76, and 7.93 microns.

*Example 2*

The substitution of equivalent quantities of butyne-1, 3β-propionoxypregna-5,16-dien-20-one, and propionic anhydride in the processes of Example 1 results in 20-(1-butynyl)-3β-propionoxypregna-5,16-dien-20β-ol.

*Example 3*

To a solution of 8 parts of 3β-acetoxy-20-ethynylpregna-5,16-dien-20β-ol in 200 parts of methanol is added 7 parts of potassium carbonate and 40 parts of water, and the resulting mixture is heated at reflux, under nitrogen, for about one hour. The reaction mixture is concentrated to about one-half volume under a stream of nitrogen, then poured into water. The resulting precipitate is collected by filtration, washed on the filter with water, and dried to afford 20-ethynylpregna-5,16-diene-3β,20β-diol. Recrystallization of this product from ethyl acetate-methylcyclohexane produces a pure sample, which displays a double melting point at about 171–173° and 187–192°. It is further characterized by an optical rotation in chloroform of −77°.

By substituting an equivalent quantity of 20-(1-butynyl)-3β-propionoxypregna-5,16-dien-20β-ol and otherwise proceeding according to the processes disclosed herein, 20-(1-butynyl)pregna-5,16-diene-3β,20β-diol is obtained.

*Example 4*

To a solution of 5.2 parts of 20-ethynylpregna-5,16-diene-3β,20β-diol in 435 parts of toluene containing 47.5 parts of cyclohexanone is added 6 parts of aluminum isopropoxide, and the resulting mixture is distilled slowly over a period of about 2 hours, during which time approximately 120 parts by volume of distillate is collected. The reaction mixture is cooled, treated with 300 parts by volume of saturated aqeuous sodium potassium tartrate, and steam-distilled to remove the organic solvents. The residual aqueous mixture is cooled, then extracted with ethyl acetate, and the organic extract is dried over anhydrous sodium sulfate, then concentrated to dryness to afford 20 - ethynyl - 20β - hydroxypregna-4,16-dien-3-one. Recrystallization from ethyl acetate-methylcyclohexane affords a pure sample, which is characterized by a double melting point at about 150° and 189°. In chloroform, it displays an optical rotation of +93° and an ultraviolet maximum at about 241 millimicrons with a molecular extinction coefficient of about 15,900.

The substitution of an equivalent quantity of 20-(1-butynyl)pregna-5,16-diene-3β,20β-diol in the process of this example results in 20-(1-butynyl)-20β-hydroxypregna-4,16-dien-3-one.

What is claimed is:
1. A compound of the structural formula

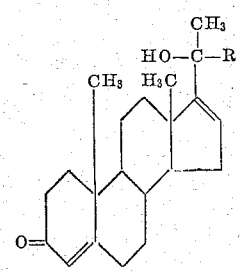

wherein R is a lower 1-alkynyl radical.

2. 20-Ethynyl-20β-hydroxypregna-4,16-dien-3-one.
3. A process for the manufacture of a compound of the structural formula

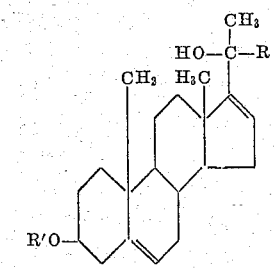

wherein R is a lower 1-alkynyl radical and R′ is selected from the group consisting of hydrogen and lower alkanoyl radicals, which comprises contacting a compound of the structural formula

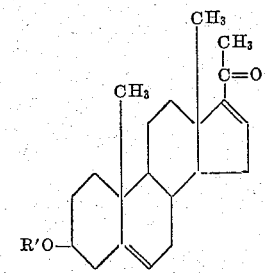

wherein R′ is as defined supra, with an organometallic reagent selected from the group consisting of 1-alkynyl magnesium halides and alkali metal 1-alkynylides, and hydrolyzing the resulting addition product by means of an inorganic acidic reagent.

References Cited in the file of this patent
UNITED STATES PATENTS

| | | |
|---|---|---|
| 3,002,008 | Tyner | Sept. 26, 1961 |
| 3,006,929 | Colton et al. | Oct. 31, 1961 |

OTHER REFERENCES

Sondheimer et al.: J. Org. Chem., vol. 24, pp. 1278–80 (September 1959).